(12) United States Patent
Goto et al.

(10) Patent No.: US 10,553,856 B2
(45) Date of Patent: Feb. 4, 2020

(54) NONAQUEOUS ELECTROLYTE SECONDARY BATTERY

(71) Applicant: PANASONIC INTELLECTUAL PROPERTY MANAGEMENT CO., LTD., Osaka-shi, Osaka (JP)

(72) Inventors: Natsumi Goto, Hyogo (JP); Masanori Sugimori, Hyogo (JP); Kouhei Tuduki, Hyogo (JP); Katsunori Yanagida, Hyogo (JP)

(73) Assignee: PANASONIC INTELLECTUAL PROPERTY MANAGEMENT CO., LTD., Osaka-shi (JP)

( * ) Notice: Subject to any disclaimer, the term of this patent is extended or adjusted under 35 U.S.C. 154(b) by 91 days.

(21) Appl. No.: 15/770,581

(22) PCT Filed: Nov. 21, 2016

(86) PCT No.: PCT/JP2016/004934
§ 371 (c)(1),
(2) Date: Apr. 24, 2018

(87) PCT Pub. No.: WO2017/094238
PCT Pub. Date: Jun. 8, 2017

(65) Prior Publication Data
US 2018/0309116 A1    Oct. 25, 2018

(30) Foreign Application Priority Data

Nov. 30, 2015   (JP) ................................ 2015-233495

(51) Int. Cl.
| | |
|---|---|
| *H01M 6/16* | (2006.01) |
| *H01M 4/36* | (2006.01) |
| *H01M 4/485* | (2010.01) |
| *H01M 4/525* | (2010.01) |
| *H01M 4/62* | (2006.01) |
| *H01M 10/0525* | (2010.01) |
| *H01M 10/0567* | (2010.01) |
| *H01M 10/0569* | (2010.01) |
| *H01M 4/587* | (2010.01) |

(52) U.S. Cl.
CPC .......... *H01M 4/364* (2013.01); *H01M 4/366* (2013.01); *H01M 4/485* (2013.01); *H01M 4/525* (2013.01); *H01M 4/587* (2013.01); *H01M 4/62* (2013.01); *H01M 10/0525* (2013.01); *H01M 10/0567* (2013.01); *H01M 10/0569* (2013.01); *H01M 2300/0028* (2013.01); *H01M 2300/0037* (2013.01); *Y02E 60/122* (2013.01); *Y02T 10/7011* (2013.01)

(58) Field of Classification Search
CPC ...... H01M 4/364; H01M 4/366; H01M 4/485; H01M 4/525; H01M 4/587; H01M 4/62; H01M 10/052; H01M 10/0525; H01M 10/0567; H01M 10/0569; H01M 2300/0028; H01M 2300/0037; Y02E 60/122; Y02T 10/7011
See application file for complete search history.

(56) References Cited

U.S. PATENT DOCUMENTS

| | | | |
|---|---|---|---|
| 6,274,271 B1 | 8/2001 | Koshiba et al. | |
| 2006/0275664 A1* | 12/2006 | Ohzuku ............... | C01G 23/005 429/220 |
| 2009/0286160 A1 | 11/2009 | Kozono et al. | |
| 2010/0015524 A1 | 1/2010 | Kim et al. | |
| 2011/0053004 A1 | 3/2011 | Saruwatari et al. | |
| 2013/0011740 A1 | 1/2013 | Konishi et al. | |
| 2013/0216911 A1* | 8/2013 | Hosoya ................ | H01M 4/362 429/221 |
| 2014/0295289 A1 | 10/2014 | Takami et al. | |
| 2015/0086840 A1 | 3/2015 | Takami et al. | |

(Continued)

FOREIGN PATENT DOCUMENTS

| | | |
|---|---|---|
| JP | 10-69922 A | 3/1998 |
| JP | 2007-299728 A | 11/2007 |
| JP | 2013-16377 A | 1/2013 |

(Continued)

OTHER PUBLICATIONS

International Search Report dated Feb. 28, 2017, issued in Counterpart of International Application No. PCT/JP2016/004934 (2 pages).

*Primary Examiner* — Raymond Alejandro
(74) *Attorney, Agent, or Firm* — Westerman, Hattori, Daniels & Adrian, LLP

(57) ABSTRACT

The present invention provides a nonaqueous electrolyte secondary battery capable of suppressing the increase in IV resistance of a battery in a combination of a negative electrode containing a lithium-titanium composite oxide and a carbon material and a positive electrode containing a lithium transition metal oxide. A nonaqueous electrolyte secondary battery according to the present invention includes a positive electrode, a negative electrode, a separator placed between the positive electrode and the negative electrode, and a nonaqueous electrolyte. The positive electrode contains a lithium transition metal oxide in which Ni accounts for 30 mole percent or more of the total molar amount of metal elements excluding Li and also contains tungsten element. The negative electrode contains a lithium-titanium composite oxide and a carbon material. The nonaqueous electrolyte contains a substance reduced on the negative electrode at a potential of 0.5 V to 1.5 V (vs. $Li/Li^+$).

8 Claims, No Drawings

(56) References Cited

U.S. PATENT DOCUMENTS

2017/0062871 A1    3/2017    Urate et al.

FOREIGN PATENT DOCUMENTS

| | | |
|---|---|---|
| JP | 2013-80726 A | 5/2013 |
| JP | 2013-131437 A | 7/2013 |
| JP | 2015-60824 A | 3/2015 |
| JP | 2015-165503 A | 9/2015 |
| WO | 2007/064043 A1 | 6/2007 |
| WO | 2015/129188 A1 | 9/2015 |
| WO | 2016/067522 A1 | 5/2016 |

* cited by examiner

NONAQUEOUS ELECTROLYTE SECONDARY BATTERY

TECHNICAL FIELD

The present invention relates to a technique for nonaqueous electrolyte secondary batteries.

BACKGROUND ART

At present, nonaqueous electrolyte secondary batteries are attracting attention as motor power supplies for electric tools, electric vehicles (EVs), hybrid electric vehicles (HEVs and PHEVs), and the like in addition to consumer applications including mobile data terminals such as mobile phones, notebook personal computers, and smartphones and are expected to be used for wider applications. Such motor power supplies are required to have increased capacity so as to be used for a long time or enhanced power characteristics in the case of repeating large-current charge and discharge in a relatively short time.

A nonaqueous electrolyte secondary battery in which a lithium-titanium composite oxide is used for a negative electrode active material is stable at high potential and therefore is increasingly expected for novel applications.

Using a lithium-titanium composite oxide for a negative electrode active material reduces the irreversible capacity of a negative electrode. Therefore, in the case of combining the negative electrode with a positive electrode in which a lithium transition metal oxide is used for a positive electrode active material, the irreversible capacity of the positive electrode is generally greater than the irreversible capacity of the negative electrode and discharge cut-off is regulated by the positive electrode in the final stage of discharge. In particular, in the case of using a lithium transition metal oxide having a layered structure for a positive electrode active material, when discharge cut-off is regulated by a positive electrode in the final stage of discharge, the positive electrode active material is likely to be over-discharged; hence, the deterioration of the positive electrode active material is caused in charge-discharge cycles in some cases.

Patent Literatures 1 and 2 disclose that a lithium-titanium composite oxide and another active material such as a carbon material are contained in a negative electrode.

CITATION LIST

Patent Literature

PTL 1: Japanese Published Unexamined Patent Application No. 10-69922

PTL 2: International Publication No. WO 2007/064043

SUMMARY OF INVENTION

In general, negative electrodes containing a lithium-titanium composite oxide and a carbon material tend to have increased irreversible capacity as compared to negative electrodes made of a lithium-titanium composite oxide. Therefore, it is conceivable that a negative electrode containing a lithium-titanium composite oxide and a carbon material is combined with a positive electrode containing a lithium transition metal oxide such that the irreversible capacity of the negative electrode is higher than the irreversible capacity of the positive electrode, whereby discharge cut-off is regulated by the negative electrode in the final stage of discharge.

However, in the case of combining the negative electrode with the positive electrode, there is a problem in that the IV resistance of a battery, particularly the IV resistance of a battery due to high-temperature storage (for example, 80° C. or higher) increases. As a result, power characteristics of the battery decrease in some cases.

It is an object of the present disclosure to provide a nonaqueous electrolyte secondary battery capable of suppressing the increase of IV resistance of a battery in a combination of a negative electrode containing a lithium-titanium composite oxide and a carbon material and a positive electrode containing a lithium transition metal oxide.

An aspect of the present disclosure provides a nonaqueous electrolyte secondary battery including a positive electrode, a negative electrode, a separator placed between the positive electrode and the negative electrode, and a nonaqueous electrolyte. The positive electrode contains a lithium transition metal oxide in which Ni accounts for 30 mole percent or more of the total molar amount of metal elements excluding Li and also contains tungsten element. The negative electrode contains a lithium-titanium composite oxide and a carbon material. The nonaqueous electrolyte contains a substance reduced on the negative electrode at a potential of 0.5 V to 1.5 V (vs. Li/Li$^+$).

According to an aspect of the present disclosure, the increase in IV resistance of a battery can be suppressed.

DESCRIPTION OF EMBODIMENTS (Underlying Knowledge Forming Basis of the Present Disclosure)

Combining a negative electrode containing a lithium-titanium composite oxide and a carbon material with a positive electrode containing a lithium transition metal oxide enables discharge cut-off to be regulated by the negative electrode in the final stage of discharge; however, causes a problem that the IV resistance of a battery, particularly the IV resistance of a battery due to high-temperature storage (for example, 80° C. or higher) increases; and is likely to lead to the decrease of power characteristics of a battery. As a result of intensive investigations, the inventors have found that, in a combination of a negative electrode containing a lithium-titanium composite oxide and a carbon material and a positive electrode containing a common lithium transition metal oxide, the IV resistance of a battery is increased because a coating leading to the increase in resistance of the negative electrode is formed on the negative electrode when the potential of the negative electrode is reduced by overcharge or the like and an electrolyte solution is reduced on the negative electrode. The inventors have conceived inventions of aspects described below on the basis of the above finding.

A nonaqueous electrolyte secondary battery according to an aspect of the present disclosure is a nonaqueous electrolyte secondary battery including a positive electrode, a negative electrode, a separator placed between the positive electrode and the negative electrode, and a nonaqueous electrolyte. The positive electrode contains a lithium transition metal oxide in which Ni accounts for 30 mole percent or more of the total molar amount of metal elements excluding Li and also contains tungsten element. The negative electrode contains a lithium-titanium composite oxide and a carbon material. The nonaqueous electrolyte contains a substance reduced on the negative electrode at a potential of 0.5 V to 1.5 V (vs. Li/Li$^+$). In accordance with the nonaqueous electrolyte secondary battery according to an aspect of the present disclosure, the increase in IV resistance of a battery, particularly the increase in IV resistance of a battery due to high-temperature storage (for example, 80° C. or higher) can be suppressed.

This mechanism is not sufficiently clear but is probably as described below. It is conceivable that tungsten in the positive electrode is dissolved from the positive electrode and is precipitated on the negative electrode by the charge and discharge of the battery and, in this course, tungsten is incorporated in a coating formed on the negative electrode by the reduction of an electrolyte solution. It is conceivable that a specifically high negative electrode resistance increase-suppressing effect is obtained by forming the coating containing tungsten on the negative electrode. As a result, the increase in IV resistance of the battery is probably suppressed, so that the decrease of power characteristics of the battery is suppressed.

In the nonaqueous electrolyte secondary battery according to another aspect of the present disclosure, a portion of tungsten element contained in the positive electrode is present in the form of a solid solution in the lithium transition metal oxide and another portion of tungsten element contained in the positive electrode is present in the form of a tungsten compound attached to the surface of the lithium transition metal oxide. This enables the increase in IV resistance of the battery to be suppressed as compared to the case where the positive electrode is simply made of a lithium transition metal oxide in which tungsten element is present in the form of a solid solution or the case where the positive electrode is simply made of a mixture of a tungsten compound and a lithium transition metal oxide.

In the nonaqueous electrolyte secondary battery according to another aspect of the present disclosure, tungsten element in the tungsten compound attached to the surface of the lithium transition metal oxide accounts for 0.01 mole percent to 3.0 mole percent of the total molar amount of metal elements, excluding Li, in the lithium transition metal oxide. This enables the increase in IV resistance of the battery to be suppressed as compared to the case where tungsten element in the tungsten compound is outside the above range.

In the nonaqueous electrolyte secondary battery according to another aspect of the present disclosure, tungsten element present in the form of a solid solution in the lithium transition metal oxide accounts for 0.01 mole percent to 3.0 mole percent of the total molar amount of metal elements, excluding Li, in the lithium transition metal oxide. This enables the increase in IV resistance of the battery to be suppressed as compared to the case where the tungsten element is outside the above range.

An example of a nonaqueous electrolyte secondary battery according to an aspect of the present disclosure is described below.

The nonaqueous electrolyte secondary battery according to an aspect of the present disclosure includes a positive electrode, a negative electrode, a separator placed between the positive electrode and the negative electrode, and a nonaqueous electrolyte. An example of the structure of the nonaqueous electrolyte secondary battery is a structure in which an electrode assembly formed by winding the positive electrode and the negative electrode with the separator therebetween and the nonaqueous electrolyte are housed in an enclosure. Alternatively, another type of electrode assembly such as a stacked electrode assembly formed by stacking the positive electrode and the negative electrode with the separator therebetween may be used instead of a wound electrode assembly. The nonaqueous electrolyte secondary battery may be of any type including, for example, a cylinder type, a prism type, a coin type, a button type, and a laminate type.

<Negative Electrode>

The negative electrode is preferably composed of, for example, a negative electrode current collector made of metal foil or the like and a negative electrode mix layer formed on the negative electrode current collector. The negative electrode current collector used may be foil of a metal stable within the potential range of the negative electrode, a film including a surface layer made of the metal, or the like. The negative electrode mix layer preferably contains a negative electrode active material, a binding agent, a conductive agent, and the like.

The negative electrode active material contains a lithium-titanium composite oxide and a carbon material. The above configuration allows the negative electrode to have higher irreversible capacity as compared to a negative electrode made of the lithium transition metal oxide.

The lithium-titanium composite oxide is preferably lithium titanate in terms of power, safety during charge and discharge, and the like. Lithium titanate is preferably lithium titanate having a spinel-type crystal structure. As the lithium titanate having the spinel-type crystal structure, $Li_{4+x}Ti_5O_{12}$ (0≤X≤3) is exemplified. The lithium titanate having the spinel-type crystal structure has little expansion and contraction associated with the intercalation and deintercalation of lithium, is unlikely to be deteriorated, and therefore is useful in obtaining batteries with excellent durability. Having a spinel structure can be readily confirmed by X-ray diffraction or the like.

The specific surface area of the lithium-titanium composite oxide is, for example, 2 $m^2$/g or more, preferably 3 $m^2$/g or more, and more preferably 4 $m^2$/g or more as measured by the BET method. When the specific surface area thereof is less than 2 $m^2$/g, input-output characteristics are low in some cases. When the specific surface area of the lithium-titanium composite oxide is too large, the crystallinity thereof is low and the durability is impaired in some cases. Therefore, the specific surface area thereof is preferably 8 $m^2$/g or less.

A portion of Ti element in the lithium-titanium composite oxide may be substituted with one or more elements different from Ti. Substituting a portion of Ti element in the lithium-titanium composite oxide with one or more elements different from Ti allows a negative electrode-regulated nonaqueous electrolyte secondary battery having an irreversible capacity ratio larger than that of the lithium-titanium composite oxide to be readily obtained. Examples of an element different from Ti include manganese (Mn), iron (Fe), vanadium (V), boron (B), and niobium (Nb).

The average primary particle size of the lithium-titanium composite oxide is preferably, for example, 0.1 μm to 10 μm and more preferably 0.3 μm to 1.0 μm. When the average primary particle size thereof is less than 0.1 μm, the number of interfaces between primary particles is too large and therefore particles are likely to be cracked due to expansion and contraction in charge-discharge cycles in some cases. However, when the average primary particle size thereof is more than 10 μm, the number of the interfaces between the primary particles is too small and therefore particularly power characteristics are low in some cases.

Examples of the carbon material include a graphite material, hard carbon, and soft carbon. In particular, the graphite material is preferable because the graphite material can reduce an electrolyte solution at relatively high potential.

The content of the lithium transition metal oxide is preferably 50 mass percent to 99 mass percent with respect to the total amount of the lithium transition metal oxide and the carbon material and more preferably 90 mass percent to 99 mass percent.

The negative electrode cu rent collector used is preferably a conductive thin film, metal foil stable within the potential range of the negative electrode, alloy foil stable within the potential range of the negative electrode, a film including a metal surface layer, or the like. In the case of using the lithium-titanium composite oxide, aluminium foil is preferably used and, for example, copper foil, nickel foil, stainless steel foil, or the like may be used.

Examples of the binding agent include a fluorinated resin, PAN, a polyimide resin, an acrylic resin, and a polyolefin resin. In the case of preparing negative electrode mix slurry using an organic solvent, polyvinylidene fluoride (PVdF) or the like is preferably used.

In the nonaqueous electrolyte secondary battery according to an aspect of the present disclosure, after the battery is assembled, the battery is preferably charged at least once or more until the potential of the negative electrode reaches 1.5 V or less and more preferably 0.5 V or less. This enables the storage of lithium in the carbon material in the negative electrode to be facilitated, increases the effect of increasing the irreversible capacity (the irreversible capacity of the negative electrode is higher than the irreversible capacity of the positive electrode), and allows discharge cut-off to be readily regulated by the positive electrode in the final stage of discharge.

<Nonaqueous Electrolyte>

The nonaqueous electrolyte contains a substance reduced on the negative electrode (mainly on the carbon material) at a potential of 0.5 V to 1.5 V (vs. Li/Li$^+$). The above configuration enables a coating to be efficiently formed on the negative electrode, which contains the lithium-titanium composite oxide and the carbon material, as compared to a common electrolyte solution free from the reduction substance and allows the negative electrode to have increased irreversible capacity.

The reduction substance is not particularly limited and may be matter reduced on the negative electrode (mainly on the carbon material) at a potential of 0.5 V to 1.5 V (vs. Li/Li$^+$). Examples thereof include propylene carbonate and phosphate triesters. The phosphate triesters include triethyl phosphate and trimethyl phosphate. Trimethyl phosphate is preferable in terms of viscosity and the like. When the negative electrode contains the graphite material, propylene carbonate is preferably used. Propylene carbonate causes a co-intercalation reaction together with the graphite material and therefore can increase the irreversible capacity of the negative electrode.

The nonaqueous electrolyte may contain a nonaqueous solvent such as a cyclic carbonate including ethylene carbonate, butylene carbonate, and vinylene carbonate or a linear carbonate including dimethyl carbonate, ethyl methyl carbonate, and diethyl carbonate in addition to the reduction substance. The nonaqueous electrolyte may contain a halide obtained by partially or entirely substituting hydrogen of the nonaqueous solvent with halogen atoms such as fluorine.

In order to suppress the generation of gas or the like, the nonaqueous electrolyte preferably contains the cyclic carbonate. The nonaqueous electrolyte preferably contains a solvent mixture of the cyclic carbonate and the linear carbonate in terms of exhibiting low viscosity, a low melting point, high lithium ion conductivity, and the like. The volume ratio of the cyclic carbonate to the linear carbonate in the solvent mixture is preferably regulated in the range of, for example, 2:8 to 5:5.

The nonaqueous electrolyte may contain an ester-containing compound such as methyl acetate, ethyl acetate, propyl acetate, methyl propionate, ethyl propionate, or γ-butyrolactone. The nonaqueous electrolyte may contain a sulfo group-containing compound such as propanesultone; an ether-containing compound such as 1,2-dimethoxyethane, 1,2-diethoxyethane, tetrahydrofuran, 1,3-dioxane, 1,4-dioxane, or 2-methyltetrahydrofuran; or the like. The nonaqueous electrolyte may contain a nitrile containing compound such as butyronitrile, valeronitrile, n-heptanenitrile, succinonitrile, glutaronitrile, adiponitrile, pimelonitrile, 1,2,3-propanetricarbonitrile, or 1,3,5-pentanetricarbonitrile; an amide-containing compound such as dimethylformamide; or the like. The nonaqueous electrolyte may contain solvents obtained by partially substituting hydrogen atoms of these compounds with fluorine atoms.

Examples of a solute (electrolyte salt) for the nonaqueous electrolyte include $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, and $LiAsF_6$. Furthermore, one obtained by adding a lithium salt (a lithium salt (for example, $LiClO_4$, $LiPO_2F_2$, or the like) containing one or more of P, B, O, S, N, and Cl) other than a fluorine-containing lithium salt to the fluorine-containing lithium salt may be used. In particular, using an electrolyte salt containing an F element in its structural formula suppresses the corrosion of a positive electrode active material by HF and the dissolution of metal.

<Positive Electrode>

The positive electrode is composed of, for example, a positive electrode current collector made of metal foil or the like and a positive electrode mix layer formed on the positive electrode current collector. The positive electrode current collector used may be foil of a metal, such as aluminium, stable within the potential range of the positive electrode, a film including a surface layer made of the metal, or the like. The positive electrode mix layer contains a positive electrode active material and preferably further contains a binding agent and a conductive agent.

The positive electrode active material contains a lithium transition metal oxide in which Ni accounts for 30 mole percent or more of the total molar amount of metal elements excluding Li and also contains tungsten element. The above configuration enables the increase in resistance of the positive electrode to be suppressed. It is conceivable that a specifically high negative electrode resistance increase-suppressing effect is obtained because when tungsten dissolved from the positive electrode is precipitated on the negative electrode by the charge and discharge of the battery, tungsten is incorporated in the coating formed on the negative electrode by the reduction of the electrolyte solution as described above. In particular, the nonaqueous electrolyte secondary battery is preferably charged once or more until the potential of the negative electrode reaches 1.5 V or less and more preferably 0.5 V or less, whereby the coating, in which tungsten is incorporated, is probably formed on the negative electrode in a larger amount or in a more uniform manner. This enables the increase in resistance of the negative electrode to be more efficiently suppressed. As a result, the decrease of power characteristics of the battery can be more efficiently suppressed.

Tungsten element may be present in any form in the positive electrode active material. Tungsten element may be present in the form of, for example, a solid solution in the lithium transition metal oxide (that is, in the form of a lithium transition metal oxide containing tungsten element), may be present in the form of a tungsten compound attached to the surfaces of particles of the lithium transition metal oxide (in a non-solid solution state that no solid solution is present in the lithium transition metal oxide), or may be present in both forms. In terms of suppressing the reduction of power characteristics of the battery or the like, it is preferable that a portion of tungsten element contained in the positive electrode is present in the form of a solid solution in the lithium transition metal oxide and another portion of tungsten element contained in the positive electrode is present in the form of a tungsten compound attached to the surfaces of the lithium transition metal oxide particles.

Tungsten element in a tungsten compound attached to the surfaces of the lithium transition metal oxide particles preferably accounts for 0.01 mole percent to 3.0 mole percent of the total molar amount of transition metals, excluding lithium, in the lithium transition metal oxide; more preferably 0.03 mole percent to 2.0 mole percent; and particularly preferably 0.05 mole percent to 1.0 mole percent. When tungsten element in the tungsten compound accounts for less than 0.01 mole percent, the formation of the coating containing tungsten is insufficient and the IV resistance of the battery is increased in some cases as compared to the case where the above range is satisfied, leading to the decrease of power characteristics of the battery in some cases. When tungsten element in the tungsten compound accounts for more than 3.0 mole percent, the amount of tungsten contained in the coating is too large, the ionic conductivity of the coating is low, and the capacity of the battery is low in some cases as compared to the case where the above range is satisfied.

The tungsten compound is preferably tungsten oxide. In this case, tungsten oxide is preferably attached to the surface of the lithium transition metal oxide in a dotted pattern and is more preferably uniformly attached to the surface thereof in a dotted pattern. Examples of tungsten oxide include $WO_3$, $WO_2$, and $W_2O_3$. Among these oxides, $WO_3$ is more preferable in that the valence is large and a coating with a high resistance increase-suppressing effect is likely to be formed in a small amount.

Tungsten element present in the form of a solid solution in the lithium transition metal oxide preferably accounts for 0.01 mole percent to 3.0 mole percent of the total molar amount of the transition metals, excluding lithium, in the lithium transition metal oxide; more preferably 0.03 mole percent to 2.0 mole percent; and particularly preferably 0.05 mole percent to 1.0 mole percent. When tungsten element present in the form of a solid solution accounts for less than 0.01 mole percent, the formation of the coating containing tungsten is insufficient and the IV resistance of the battery is increased in some cases as compared to the case where the above range is satisfied, leading to the decrease of power characteristics of the battery in some cases. When tungsten element present in the form of a solid solution accounts for more than 3.0 mole percent, the amount of tungsten contained in the coating is too large, the ionic conductivity of the coating is low, and the capacity of the battery is low in some cases as compared to the case where the above range is satisfied. The expression "tungsten is present in the form of a solid solution in the lithium transition metal oxide" means a state in which a portion of a metal element, such as nickel or cobalt, in the lithium transition metal oxide active material is substituted with tungsten element and tungsten element is present in the inside (crystal) of the lithium transition metal oxide.

For the presence of tungsten in the form of a solid solution in the lithium transition metal oxide and the measurement of the amount of solid solution, methods below are cited. The presence of tungsten in the form of a solid solution in the lithium transition metal oxide can be confirmed and the amount of solid solution can be measured in such a manner that, for example, a powder of the lithium transition metal oxide is cut or is surface-ground and tungsten is qualitatively and quantitatively analyzed by Auger electron spectroscopy (AES), secondary ion mass spectroscopy (SIMS), transmission electron microscope (TEM)—energy dispersive X-ray spectroscopy (EDX), electron probe microanalyser (EPMA), or the like.

The total amount of tungsten present in the form of a solid solution in the lithium transition metal oxide and tungsten attached to the lithium transition metal oxide is determined in such a manner that, for example, a powder of the lithium transition metal oxide is washed with an acid solution for 20 minutes and the amount of tungsten dissolved in the acid solution is measured by inductively coupled plasma ionization (ICP) emission spectrometry. From measurement results of the amount of solid solution and the total amount, the amount of tungsten, not in the form of a solid solution, attached to the lithium transition metal oxide can be calculated.

The lithium transition metal oxide is not particularly limited and may be a lithium transition metal oxide in which Ni accounts for 30 mole percent or more of the total molar amount of metal elements excluding Li. The lithium transition metal oxide may contain, for example, at least one of other transition metals such as manganese (Mn) and cobalt (Co) in addition to nickel (Ni). The lithium transition metal oxide may contain a non-transition metal such as aluminium (Al) or magnesium (Mg). Examples of the lithium transition metal oxide include Ni—Co—Mn-based, Ni—Co—Al-based, and Ni—Mn—Al-based lithium transition metal oxides. These oxides may be used alone or in combination.

Among the above oxides, a Ni—Co—Mn-based lithium transition metal oxide is preferable in terms of power characteristics, regeneration characteristics, and the like. An example of the Ni—Co—Mn-based lithium transition metal oxide may be one in which the molar ratio of Ni to Co to Mn is 1:1:1, 5:2:3, 4:4:2, 5:3:2, 6:2:2, 55:25:20, 7:2:1, 7:1:2, or 8:1:1. In particular, in terms of increasing the capacity of the positive electrode, one in which the proportion of Ni or Co is greater than that of Mn is preferably used and one in which the difference between the molar ratio of Ni to the sum of moles of Ni, Co, and Mn and the molar ratio of Mn to the sum thereof is 0.04% or more is particularly preferable.

An example of the Ni—Co—Al-based lithium transition metal oxide may be one in which the molar ratio of Ni to Co to Al is 82:15:3, 82:12:6, 80:10:10, 60:15:5, 67:9:4, 90:5:5, or 95:3:2.

The lithium transition metal oxide is not limited to the above-exemplified elements and may contain an additive element. Examples of the additive element include boron, magnesium, aluminium, titanium, vanadium, iron, copper, zinc, niobium, zirconium, tin, tantalum, sodium, potassium, barium, strontium, and calcium.

The average particle size of the lithium transition metal oxide is preferably, for example, 2 to 30 μm. Particles of the first and second lithium transition metal oxides may be secondary particles composed of bonded primary particles with a size of, for example, 100 nm to 10 μm. The average particle size thereof can be measured with, for example, a particle size distribution analyzer (manufactured by HORIBA).

The average particle size of the tungsten compound attached to the surfaces of the transition metal oxide particles is preferably less than the average particle size of the lithium transition metal oxide and is particularly preferably less than one-fourth thereof. When the tungsten compound is larger than the lithium transition metal composite oxide, the contact area between the tungsten compound and the lithium transition metal oxide is small and the effect of suppressing the increase in resistance of the negative electrode is not sufficiently exhibited in some cases.

An example of a method for forming a solid solution of tungsten in the lithium transition metal oxide and an example of a method for attaching the tungsten compound to the surface of the lithium transition metal oxide are described.

The method for forming the tungsten solid solution in the lithium transition metal oxide is a method in which raw materials including a transition metal oxide containing nickel, a lithium compound such as lithium hydroxide or lithium carbonate, and a tungsten compound such as tungsten oxide are mixed together, followed by firing at a predetermined temperature, or the like. The firing temperature is preferably 650° C. to 1,000° C. and particularly preferably 700° C. to 950° C. When the firing temperature is lower than 650° C. the decomposition of the lithium compound, such as lithium hydroxide, is insufficient and reaction is unlikely to proceed. When the firing temperature is 1,000° C. or higher, cation mixing is active and inhibits the diffusion of $Li^+$; hence, the specific capacity is low or load characteristics are low in some cases.

The method for attaching tungsten oxide to the surface of the lithium transition metal oxide is a method in which tungsten oxide is mechanically mixed with the lithium transition metal oxide in advance and is thereby attached thereto, a method in which tungsten oxide is added in a step of kneading the conductive agent and the binding agent, or the like.

The lithium transition metal oxide is not limited to the case of using the lithium transition metal oxide, which contains 30 mole percent or more of Ni, alone and may be used in combination with another positive electrode active material. The other positive electrode active material is not particularly limited and may be, for example, a compound capable of reversibly intercalating and deintercalating lithium ions. The other positive electrode active material used may be, for example, a layer-structured material, such as lithium cobaltate, capable of reversibly intercalating and deintercalating lithium ions with a stable crystal structure maintained; a spinel-structured material such as a lithium manganese oxide; an olivine-structure material; or the like.

The positive electrode preferably contains a phosphate compound. When the phosphate compound is contained therein, a coating made of a decomposition product of an electrolyte solution is formed on the positive electrode active material during charge and discharge in the initial usage of the battery, whereby the corrosion of the positive electrode active material by HF and the dissolution of metal are inhibited. This suppresses the further reaction of a corroded portion of the positive electrode active material with the electrolyte solution to suppress the generation of an $H_2$ gas, a CO gas, a $CO_2$ gas, and the like. The phosphate compound in the positive electrode is preferably lithium Phosphate. The lithium phosphate is preferably $Li_3PO_4$.

The binding agent is a fluoropolymer, a rubber polymer, or the like. Examples of the fluoropolymer include polytetrafluoroethylene (PTFE), polyvinylidene fluoride (PVdF), and modifications of these polymers. Examples of the rubber polymer include ethylene-propylene-isoprene copolymers and ethylene-propylene-butadiene copolymers. These polymers and copolymers may be used alone or in combination. The binding agent may be used in combination with a thickening agent such as carboxymethylcellulose (CMC) or polyethylene oxide (PEO).

Examples of the conductive agent include carbon materials such as carbon black, acetylene black, Ketjenblack, graphite, vapor-grown carbon (VGCF), carbon nano tubes, and carbon nanofibers. These materials may be used alone or in combination.

<Separator>

Examples of the separator include separators made of polypropylene, separators made of polyethylene, polypropylene-polyethylene multilayer separators, separators surface-coated with resin such as an aramid resin, and separators containing cellulose. The separator used is preferably a polypropylene-containing separator.

A layer made of an inorganic filler may be placed at the interface between the positive electrode and the separator or the interface between the negative electrode and the separator. Examples of the filler include oxides containing one or more of titanium, aluminium, silicon, magnesium, and the like; phosphate compounds containing one or more of titanium, aluminium, silicon, magnesium, and the like; and those surface-treated with a hydroxide or the like.

EXAMPLES

The present invention is further described below in detail with reference to examples. The present invention is not limited to the examples.

Example 1

Preparation of Positive Electrode Active Material

A hydroxide, represented by $[Ni_{0.51}Co_{0.23}Mn_{0.26}](OH)_2$, obtained by coprecipitation was fired at 500° C., whereby a nickel-cobalt-manganese composite oxide was obtained. Next, lithium carbonate, the nickel-cobalt-manganese composite oxide obtained as described above, and tungsten oxide ($WO_3$) were mixed together in an Ishikawa-type Raikai mortar such that the molar ratio of lithium to the total amount of nickel, cobalt, and manganese to tungsten was 1.20:1:0.005. Thereafter, the mixture was heat-treated at 900° C. for 20 hours in an air atmosphere, followed by crushing, whereby a lithium-nickel-manganese-cobalt composite oxide, represented by $Li_{1.07}[Ni_{0.51}Co_{0.23}Mn_{0.26}]O_2$, containing a solid solution of tungsten was obtained. An obtained powder was observed with a scanning electron microscope (SEM), whereby it was confirmed that no unreacted tungsten oxide ($WO_3$) remained. This was referred to as Positive Electrode Active Material A1.

In obtained Positive Electrode Active Material A1, the molar ratio of the total amount of nickel, cobalt, and manganese to tungsten present in the form of a solid solution was 1:0.005.

Preparation of Positive Electrode Plate

Positive Electrode Active Material A1, acetylene black serving as a conductive agent, and polyvinylidene fluoride serving as a binding agent were weighed such that the mass ratio of Positive Electrode Active Material A1 to acetylene black to polyvinylidene fluoride was 91:7:2, followed by adding N-methyl-2-pyrrolidone serving as a dispersion medium. These materials were kneaded, whereby positive electrode mix slurry was prepared. Next, the positive electrode mix slurry was applied to both surfaces of a positive electrode current collector made of aluminium foil, this was dried and was then rolled using a rolling roller, and a current-collecting tab made of aluminium was attached thereto, whereby a positive electrode plate including the positive electrode current collector and positive electrode mix layers formed on both surfaces of the positive electrode current collector was prepared.

Preparation of Lithium-Titanium Composite Oxide

Source powders of $LiOH \cdot H_2O$ and $TiO_2$, which were commercially available reagents, were weighed such that the Li/Ti molar mixing ratio was slightly higher in Li than the stoichiometric ratio, followed by mixing these powders in a mortar. The raw material $TiO_2$ used was one having an anatase crystal structure. The mixed source powders were put in a crucible made of $Al_2O_3$ and were heat-treated at 850° C. for 12 hours in an air atmosphere, whereby $Li_4Ti_5O_{12}$ was obtained.

The heat-treated material was taken out of the crucible and was then crushed in a mortar, whereby a coarse powder of $Li_4Ti_6O_{12}$ was obtained. The obtained $Li_4Ti_5O_{12}$ coarse powder was measured with a powder X-ray diffratometer (manufactured by Rigaku Corporation), whereby a diffraction pattern of a single phase having a spinel structure with a space group assigned to Fd-3m was obtained.

The obtained $Li_4Ti_5O_{12}$ coarse powder was jet-milled and was then classified. An obtained powder was observed with a scanning electron microscope (SEM), whereby it was confirmed that the coarse powder was milled into single particles with a size of about 0.7 µm. The BET specific surface area of the classified $Li_4Ti_5O_{12}$ powder was measured using a specific surface area analyzer (TriStar II 3020, manufactured by Shimadzu Corporation) and was found to be 6.8 $m^2/g$.

Preparation of Negative Electrode Plate $Li_4Ti_5O_{12}$ obtained by the above method, a graphite material, carbon black serving as a conductive agent, polyvinylidene fluoride serving as a binder, and fluorinated graphite serving as an additive were weighed such that the mass ratio of $Li_4Ti_5O_{12}$ to graphite to acetylene black to PVdF was 90.9:5:6.4:2.7, followed by adding N-methyl-2-pyrrolidone serving as a dispersion medium. These materials were kneaded, whereby negative electrode mix slurry was prepared. Next, the negative electrode mix slurry was applied to both surfaces of a negative electrode current collector made of aluminium foil, this was dried and was then rolled using a rolling roller, and a current-collecting tab made of aluminium was attached thereto, whereby a negative electrode plate including the negative electrode current collector and negative electrode mix layers formed on both surfaces of the negative electrode current collector was prepared.

Preparation of Nonaqueous Electrolyte $LiPF_6$ serving as a solute was dissolved in a solvent mixture of PC (propylene carbonate), EMC (ethyl methyl carbonate), and DMC (dimethyl carbonate) mixed at a volume ratio of 25:35:40 at a rate of 1.2 moles per liter.

Preparation of Battery

The positive electrode and negative electrode obtained in this way were wound with a separator composed of three layers of PP (polypropylene)/PE (polyethylene)/PP therebetween so as to face each other, whereby a roll was prepared. After the roll was vacuum-dried at 105° C. for 150 minutes, the roll was sealed in an enclosure composed of an aluminium laminate sheet together with the nonaqueous electrolyte in a glove box under an argon atmosphere, whereby a battery was prepared. The design capacity of the battery was 12 mAh.

Example 2

A hydroxide, represented by $[Ni_{0.51}Co_{0.23}Mn_{0.26}](OH)_2$, obtained by coprecipitation was fired at 500° C., whereby a nickel-cobalt-manganese composite oxide was obtained. Next, lithium carbonate and the nickel-cobalt-manganese composite oxide obtained as described above were mixed together in an Ishikawa-type Raikai mortar such that the molar ratio of lithium to the total amount of nickel, cobalt, and manganese was 1.20:1. Thereafter, the mixture was heat-treated at 900° C. for 20 hours in an air atmosphere, followed by crushing, whereby a lithium-nickel-manganese-cobalt composite oxide (a lithium-nickel-manganese-cobalt composite oxide containing no solid solution of tungsten) represented by $Li_{1.07}[Ni_{0.51}Co_{0.23}Mn_{0.26}]O_2$ was obtained.

Obtained $Li_{1.07}[Ni_{0.51}Co_{0.23}Mn_{0.26}]O_2$ and tungsten oxide ($WO_3$) were mixed together using HIVIS DISPER MIX (manufactured by PRIMIX Corporation), whereby a positive electrode active material was prepared. In this operation, mixing was performed such that the molar ratio of the total amount of nickel, cobalt, and manganese in $Li_{1.07}[Ni_{0.465}Co_{0.275}Mn_{0.26}]O_2$ to tungsten in tungsten oxide ($WO_3$) was 1:0.005. This was referred to as Positive Electrode Active Material A2.

In obtained Positive Electrode Active Material A2, the molar ratio of the total amount of nickel, cobalt, and manganese to tungsten contained in the form of tungsten oxide was 1:0.005. Observing a prepared positive electrode plate with a scanning electron microscope (SEM) showed that tungsten oxide particles with an average size of 150 nm were attached to the surfaces of particles of the lithium-nickel-manganese-cobalt composite oxide.

In Example 2, a battery was prepared under substantially the same conditions as those used in Example 1 except that Positive Electrode Active Material A2 was used.

Example 3

A hydroxide, represented by $[Ni_{0.465}Co_{0.275}Mn_{0.26}]O_2$, obtained by coprecipitation was fired at 500° C., whereby a nickel-cobalt-manganese composite oxide was obtained. Next, lithium carbonate, the nickel-cobalt-manganese composite oxide obtained as described above, and tungsten oxide ($WO_3$) were mixed together in an Ishikawa-type Raikai mortar such that the molar ratio of lithium to the total amount of nickel, cobalt, and manganese to tungsten was 1.20:1:0.005. Thereafter, the mixture was heat-treated at 900° C. for 20 hours in an air atmosphere, followed by crushing, whereby a lithium-nickel-manganese-cobalt composite oxide, represented by $Li_{1.07}[Ni_{0.465}Co_{0.275}Mn_{0.26}]O_2$, containing a solid solution of tungsten was obtained. An obtained powder was observed with a scanning electron microscope (SEM), whereby it was confirmed that no unreacted tungsten oxide ($WO_3$) remained.

Obtained $Li_{1.07}[Ni_{0.465}Co_{0.275}Mn_{0.26}]O_2$ and tungsten oxide ($WO_3$) were mixed together using HIVIS DISPER MIX (manufactured by PRIMIX Corporation), whereby a positive electrode active material was prepared. In this operation, mixing was performed such that the molar ratio of the total amount of nickel, cobalt, and manganese in $Li_{1.07}[Ni_{0.465}Co_{0.275}Mn_{0.26}]O_2$ to tungsten in tungsten oxide ($WO_3$) was 1:0.005. This was referred to as Positive Electrode Active Material A3.

In obtained Positive Electrode Active Material A3, the molar ratio of the total amount of nickel, cobalt, and manganese to tungsten present in the form of a solid solution to tungsten contained in the form of tungsten oxide was 1:0.005:0.005. Observing a prepared positive electrode plate with a scanning electron microscope (SEM) showed that tungsten oxide particles with an average size of 150 nm were attached to the surfaces of particles of the lithium-nickel-manganese-cobalt composite oxide.

In Example 3, a battery was prepared under substantially the same conditions as those used in Example 1 except that Positive Electrode Active Material A3 was used.

Example 4

A battery was prepared under substantially the same conditions as those used in Example 3 except using a nonaqueous electrolyte obtained by adding 3 volume percent of trimethyl phosphate to a solvent mixture of EC (ethylene carbonate), EMC (ethyl methyl carbonate), and DMC (dimethyl carbonate) mixed at a volume ratio of 30:40:40 and dissolving $LiPF_6$ serving as a solute in the solvent mixture at a rate of 1.2 moles per liter.

Example 5

A battery was prepared under substantially the same conditions as those used in Example 3 except using a nonaqueous electrolyte obtained by adding 3 volume percent of trimethyl phosphate to a solvent mixture of PC (propylene carbonate), EMC (ethyl methyl carbonate), and DMC (dimethyl carbonate) mixed at a volume ratio of 25:35:40 and dissolving $LiPF_6$ serving as a solute in the solvent mixture at a rate of 1.2 moles per liter.

Example 6

A battery was prepared under substantially the same conditions as those used in Example 3 except using a nonaqueous electrolyte obtained by adding 0.1 volume percent of trimethyl phosphate to a solvent mixture of PC (propylene carbonate), EMC (ethyl methyl carbonate), and DMC (dimethyl carbonate) mixed at a volume ratio of 25:35:40 and dissolving $LiPF_6$ serving as a solute in the solvent mixture at a rate of 1.2 moles per liter.

Example 7

A battery was prepared under substantially the same conditions as those used in Example 3 except using a nonaqueous electrolyte obtained by adding 0.5 volume percent of trimethyl phosphate to a solvent mixture of PC (propylene carbonate), EMC (ethyl methyl carbonate), and DMC (dimethyl carbonate) mixed at a volume ratio of 25:35:40 and dissolving $LiPF_6$ serving as a solute in the solvent mixture at a rate of 1.2 moles per liter.

Example 8

A battery was prepared under substantially the same conditions as those used in Example 3 except using a nonaqueous electrolyte obtained by adding 1 volume percent of trimethyl phosphate to a solvent mixture of PC (propylene carbonate), EMC (ethyl methyl carbonate), and DMC (dimethyl carbonate) mixed at a volume ratio of 25:35:40 and dissolving $LiPF_6$ serving as a solute in the solvent mixture at a rate of 1.2 moles per liter.

Example 9

A battery was prepared under substantially the same conditions as those used in Example 3 except using a nonaqueous electrolyte obtained by adding 5 volume percent of trimethyl phosphate to a solvent mixture of PC (propylene carbonate), EMC (ethyl methyl carbonate), and DMC (dimethyl carbonate) mixed at a volume ratio of 25:35:40 and dissolving $LiPF_6$ serving as a solute in the solvent mixture at a rate of 1.2 moles per liter.

Comparative Example 1

A hydroxide, represented by $[Ni_{0.51}Co_{0.23}Mn_{0.26}]O_2$, obtained by coprecipitation was fired at 500° C., whereby a nickel-cobalt-manganese composite oxide was obtained. Next, lithium carbonate and the nickel-cobalt-manganese composite oxide obtained as described above were mixed together in an Ishikawa-type Raikai mortar such that the molar ratio of lithium to the total amount of nickel, cobalt, and manganese was 1.20:1. Thereafter, the mixture was heat-treated at 900° C. for 20 hours in an air atmosphere, followed by crushing, whereby a lithium-nickel-manganese-cobalt composite oxide represented by $Li_{1.07}[Ni_{0.51}Co_{0.23}Mn_{0.26}]O_2$ was obtained. This was referred to as Positive Electrode Active Material B1.

In Comparative Example 1, a battery was prepared under substantially the same conditions as those used in Example 1 except that Positive Electrode Active Material B1 was used and no graphite material was used o prepare a negative electrode plate.

Comparative Example 2

In Comparative Example 2, a battery was prepared under substantially the same conditions as those used in Example 1 except that no graphite material was used to prepare a negative electrode plate.

Comparative Example 3

In Comparative Example 3, a battery was prepared under substantially the same conditions as those used in Example 1 except that Positive Electrode Active Material B1 was used.

Comparative Example 4

In Comparative Example 4, a battery was prepared under substantially the same conditions as those used in Example 3 except using a nonaqueous electrolyte obtained by dissolving $LiPF_6$ serving as a solute in a solvent mixture of EC (ethylene carbonate), EMC (ethyl methyl carbonate), and DMC (dimethyl carbonate) mixed at a volume ratio of 30:40:40 at a rate of 1.2 moles per liter.

The battery of each of Examples 1 to 9 and Comparative Examples 1 to 4 was charged and discharged for five cycles under conditions below.

(Initial Charge-Discharge Conditions)
Charge-discharge conditions in the first cycle: Constant-current charge was performed at a charge current of 2.4 mA under 25° C. temperature conditions until a capacity (about 13.2 Ah) that was 1.1 times the design capacity of lithium titanate in a negative electrode was obtained. This enables the potential of the negative electrode to be reduced to about 0.5 V. Next, constant-current discharge was performed at a discharge current of 2.4 mA until 1.5 V.

The change in IV resistance before and after the storage test was calculated as the rate of increase in resistance before and after storage. Results of the IV resistance of the battery of each of Examples 1 to 3 and Comparative Examples 1 to 3 and results of the rate of increase in resistance in Examples 3 to 5 and Comparative Example 4 were summarized in Table 1.

TABLE 1

|  | Positive Electrode | | Negative Electrode | | | Post-initial | Rate of Increase in IV Resistance |
| --- | --- | --- | --- | --- | --- | --- | --- |
|  | Composition Ratio Ni/Co/Mn | Addition | Active Material 1 | Additive | Electrolyte Solution (Solvent Composition) | IV Resistance (Ω) | Before and After Storage (%) |
| Example 1 | 51/23/26 | W Solid Solution (0.5 mol) | LTO | Graphite | 1.2M LiPF6 PC/EMC/DMC = 25/35/40 | 0.84 |  |
| Example 2 | 51/23/26 | WO₃ (0.5 mol) | LTO | Graphite | 1.2M LiPF6 PC/EMC/DMC = 25/35/40 | 0.86 |  |
| Example 3 | 46.5/27.5/26 | W Solid Solution (0.5 mol) + WO₃ (0.5 mol) | LTO | Graphite | 1.2M LiPF6 PC/EMC/DMC = 25/35/40 | 0.74 | 5.2 |
| Example 4 | 46.5/27.5/26 | W Solid Solution (0.5 mol) + WO₃ (0.5 mol) | LTO | Graphite | 1.2M LiPF6 PC/EMC/DMC + TMP = 30/40/40 + 3 vol % |  | 6.4 |
| Example 5 | 46.5/27.5/26 | W Solid Solution (0.5 mol) + WO₃ (0.5 mol) | LTO | Graphite | 1.2M LiPF6 PC/EMC/DMC + TMP = 25/35/40 + 3 vol % |  | 5.1 |
| Example 6 | 46.5/27.5/26 | W Solid Solution (0.5 mol) + WO3 (0.5 mol) | LTO | Graphite | 1.2M LiPF6 PC/EMC/DMC + TMP = 25/35/40 + 0.1 vol % |  | 5.1 |
| Example 7 | 46.5/27.5/26 | W Solid Solution (0.5 mol) + WO3 (0.5 mol) | LTO | Graphite | 1.2M LiPF6 PC/EMC/DMC + TMP = 25/35/40 + 0.5 vol % |  | 4.9 |
| Example 8 | 46.5/27.5/26 | W Solid Solution (0.5 mol) + WO3 (0.5 mol) | LTO | Graphite | 1.2M LiPF6 PC/EMC/DMC + TMP = 25/35/40 + 1 vol % |  | 4.9 |
| Example 9 | 46.5/27.5/26 | W Solid Solution (0.5 mol) + WO3 (0.5 mol) | LTO | Graphite | 1.2M LiPF6 PC/EMC/DMC + TMP = 25/35/40 + 5 vol % |  | 5.3 |
| Comparative Example 1 | 51/23/26 | None | LTO | None | 1.2M LiPF6 PC/EMC/DMC = 25/35/40 | 0.92 |  |
| Comparative Example 2 | 51/23/26 | W Solid Solution (0.5 mol) | LTO | None | 1.2M LiPF6 PC/EMC/DMC = 25/35/40 | 0.90 |  |
| Comparative Example 3 | 51/23/26 | None | LTO | Graphite | 1.2M LiPF6 PC/EMC/DMC = 25/35/40 | 0.94 |  |
| Comparative Example 4 | 46.5/27.5/26 | W Solid Solution (0.5 mol) + WO3 (0.5 mol) | LTO | Graphite | 1.2M LiPF6 PC/EMC/DMC = 30/40/40 |  | 8.0 |

Charge-discharge conditions in the second to fifth cycles: Constant-current charge was performed at a charge current of 12 mA under 25° C. temperature conditions until the voltage of the battery reached 2.65 V and constant-voltage charge was further performed at a constant voltage of 2.65 V until the current reached 2.4 mA. Next, constant current discharge was performed at a discharge current of 12 mA until 1.5 V. Incidentally, the interval between the charge and the discharge was 10 minutes.

The discharge capacity determined in the fifth cycle was defined as the rated capacity.

(High-Temperature Storage Test)

After the above initial charge and discharge for five cycles, the battery was charged to 2.65 V under 25° C. temperature conditions in a constant current mode, was left stationary for 20 hours under 80° C. temperature conditions, and was then discharged under 25° C. temperature conditions.

(IV Resistance Measurement Conditions)

After the above initial charge and discharge for five cycles and the above high-temperature storage test, the battery was discharged to 1.5 V under 25° C. temperature conditions in a constant current mode and was then charged to 50% of the rated capacity. From this state, the battery was discharged at a current of 2 mA, 10 mA, 20 mA, and 50 mA for 10 seconds. The voltage measured after discharge for 10 seconds was plotted against each current, followed by determining the IV resistance front the slope obtained by linear approximation.

Comparing Comparative Examples 1 and 2 showed that the battery of Comparative Example 2 exhibited lower post-initial charge-discharge IV resistance. Comparing Example 1 and Comparative Example 3 showed that Example 1 exhibited lower post-initial charge-discharge IV resistance and exceeded the effect of adding tungsten to a positive electrode, the effect being estimated from a comparison between Comparative Examples 1 and 2. In a battery in which a negative electrode contains graphite and an electrolyte solution contains PC like Example 1, graphite reacts with PC and the electrolyte solution is reduced, whereby a coating is formed on the negative electrode. Furthermore, it is conceivable that the increase in resistance of a positive electrode is suppressed by tungsten contained in the positive electrode, the effect of specifically suppressing the increase in resistance of the negative electrode is obtained because tungsten dissolved from the positive electrode is incorporated in the coating on the negative electrode, and the increase of post-initial charge-discharge IV resistance is suppressed. On the other hand, in a battery in which a negative electrode contains no graphite material like Comparative Examples 1 and 2, it is conceivable that since no coating is formed on the negative electrode unlike Example 1, the effect of suppressing the increase in resistance of the negative electrode is not, obtained, and the increase of post-initial charge-discharge IV resistance is significant.

Comparing Examples 1, 2, and 3 resulted in that Example 1 rather than Example 2 exhibited lower post-initial charge-discharge IV resistance and Example 3 exhibited the lowest post-initial charge-discharge IV resistance. This is probably because tungsten is more likely to be dissolved out in the case where tungsten is present in the form of a solid solution in a lithium transition metal oxide rather than the case where tungsten is attached to the surface of the lithium transition metal oxide in the form of $WO_3$ and the effect of suppressing the increase in resistance of a negative electrode is increased. Furthermore, it is conceivable that when tungsten is present in the form of a solid solution in a lithium transition metal oxide and is attached to the surface of the lithium transition metal oxide in the form of $WO_3$, tungsten is more likely to be dissolved out and the effect of suppressing the increase in resistance of a negative electrode is further increased.

Comparing Examples 3, 4, and 5 with Comparative Example 4 resulted in that Examples 3 and 4 exhibited a lower rate of increase in resistance before and after storage as compared to Comparative Example 4 and Example 5 exhibited the lowest crate of increase in resistance before and after storage. This is probably because when a negative electrode contains graphite and an electrolyte solution does not contain a substance, such as PC or trimethyl phosphate, reduced on the negative electrode (mainly on a carbon material) at a potential of 0.5 V to 1.5 V, a coating is unlikely to be formed on the negative electrode and the specific effect of suppressing the increase in resistance of the negative electrode is not obtained, the effect being caused by the fact that tungsten dissolved from a positive electrode is incorporated in a coating on the negative electrode. Furthermore, it is conceivable that when both of PC and trimethyl phosphate are contained, the effect of suppressing the increase in resistance of the negative electrode is further increased.

Comparing Examples 3 and 5 to 9 shows that trimethyl phosphate has the effect of suppressing the increase in resistance of a negative electrode to a certain extent even though the content thereof is small, 0.1 volume percent. When the content of trimethyl phosphate is large, up to 5 volume percent, the effect of suppressing the increase in resistance thereof is unlikely to be obtained. It is conceivable that the tendency to inhibit charge and discharge arises because the increase in content of trimethyl phosphate allows a thick coating to be formed on a negative electrode.

INDUSTRIAL APPLICABILITY

The present invention is applicable to nonaqueous electrolyte secondary batteries.

The invention claimed is:

1. A nonaqueous electrolyte secondary battery comprising a positive electrode, a negative electrode, a separator placed between the positive electrode and the negative electrode, and a nonaqueous electrolyte,
    wherein the positive electrode contains a lithium transition metal oxide in which Ni accounts for 30 mole percent or more of the total molar amount of metal elements excluding Li and also contains tungsten element,
    the negative electrode contains a lithium-titanium composite oxide and a carbon material, and
    the nonaqueous electrolyte contains propylene carbonate and a phosphate trimester, and the phosphate triester is mixed with a solvent for the nonaqueous electrolyte in a proportion of 0.1 volume percent to 5 volume percent.

2. The nonaqueous electrolyte secondary battery according to claim 1, wherein a portion of tungsten element contained in the positive electrode is present in the form of a solid solution in the lithium transition metal oxide and another portion of tungsten element contained in the positive electrode is present in the form of a tungsten compound attached to the surface of the lithium transition metal oxide.

3. The nonaqueous electrolyte secondary battery according to claim 2, wherein tungsten element in the tungsten compound accounts for 0.01 mole percent to 3.0 mole percent of the total molar amount of metal elements, excluding Li, in the lithium transition metal oxide.

4. The nonaqueous electrolyte secondary battery according to claim 1, wherein tungsten element present in the form of a solid solution in the lithium transition metal oxide accounts for 0.01 mole percent to 3.0 mole percent of the total molar amount of metal elements, excluding Li, in the lithium transition metal oxide.

5. The nonaqueous electrolyte secondary battery according to claim 2, wherein the tungsten compound is tungsten oxide.

6. The nonaqueous electrolyte secondary battery according to claim 1, wherein the carbon material is a graphite material.

7. The nonaqueous electrolyte secondary battery according to claim 1, wherein the phosphate triester is trimethyl phosphate.

8. The nonaqueous electrolyte secondary battery according to claim 5, wherein the tungsten oxide is $WO_3$.

* * * * *